N. E. BROWN.
CAMERA.
APPLICATION FILED JAN. 21, 1919.
1,366,158.
Patented Jan. 18, 1921.
2 SHEETS—SHEET 1.
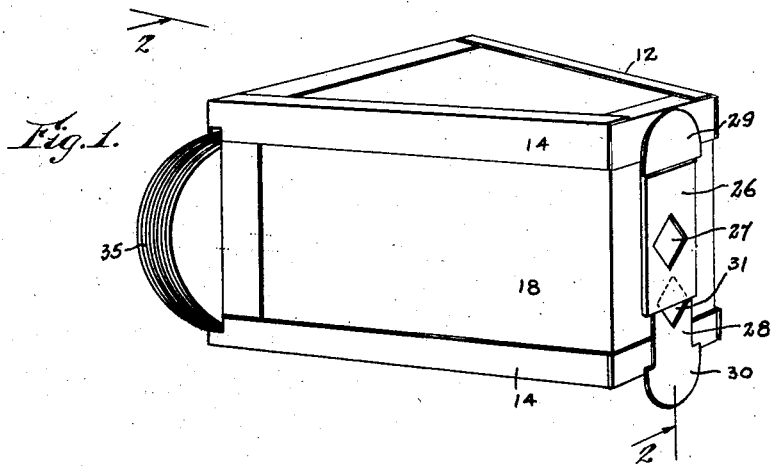
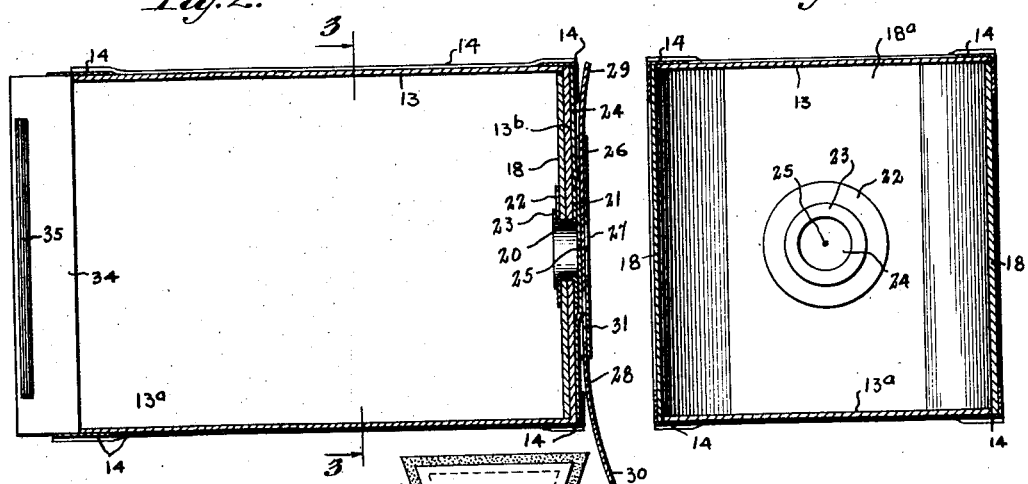
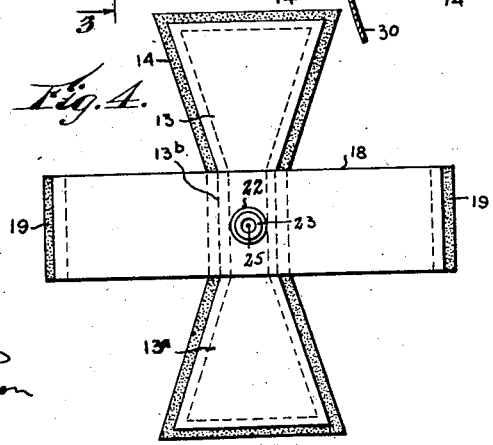
WITNESSES
INVENTOR
N. E. Brown,
BY
ATTORNEYS

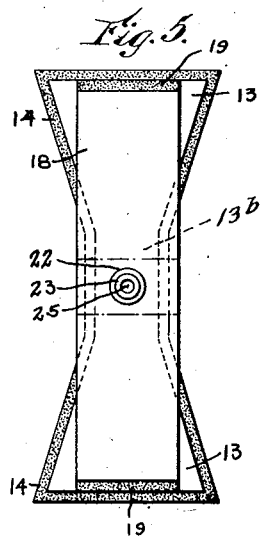
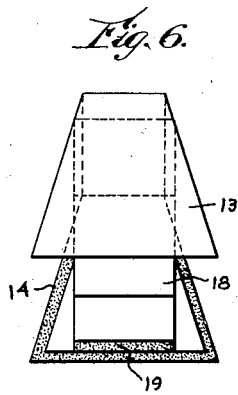
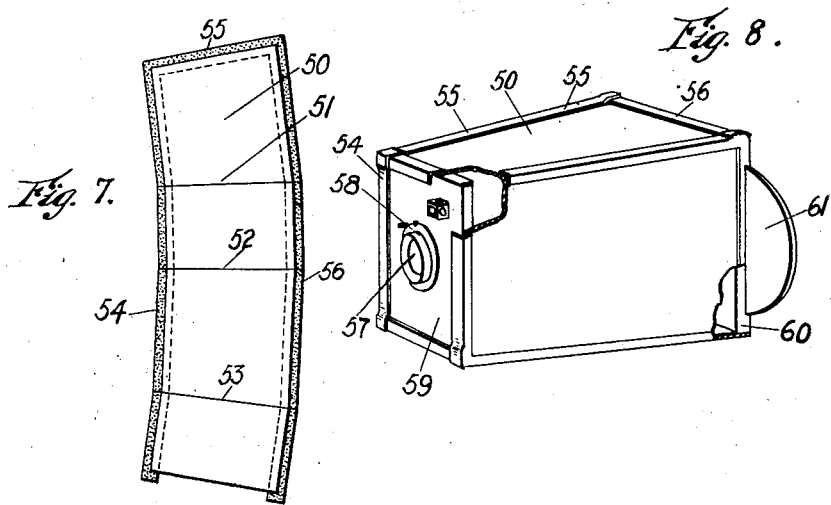

UNITED STATES PATENT OFFICE.

NAT ELMER BROWN, OF GRAND HAVEN, MICHIGAN.

CAMERA.

1,366,158.  Specification of Letters Patent.  Patented Jan. 18, 1921.

Application filed January 21, 1919. Serial No. 272,290.

*To all whom it may concern:*

Be it known that I, NAT ELMER BROWN, a citizen of the United States, and a resident of Grand Haven, in the county of Ottawa and State of Michigan, have invented a new and Improved Camera, of which the following is a full, clear, and exact description.

My invention relates to cameras of the kind used in photography, my more particular purpose being to provide a camera which can be built up cheaply of cardboard or other sheet material, cut in blank form in such a manner that it may be folded flat and placed in envelops, to remain convenient for carrying until desired for use, when it may be set up and formed into a temporary camera at any time or place.

To readily accomplish setting up the temporary camera the borders of the sheets or cardboard blanks are provided with means for easily joining the edges to form a light-tight interior. This is preferably accomplished by attaching to the edges which are required to be joined flexible gummed binding strips, which only require moistening before being joined.

A most important feature of my invention is the utilization of the adhesive-edged or gummed-bordered cardboard or sheet forms in connection with the well known daylight-loading photographic film packs. This film pack at the same time serves as a container for the films upon which the pictures are to be made as well as a base of attachment to complete the formation of the temporary camera. With a pinhole lens arrangement incorporated in the sheet forms, I have a construction which embodies all of the essential features necessary for making either a single picture or a series of pictures equivalent to the number of films in the pack, this being accomplished as is usual with film pack cameras. The operation of the last film completes the protection from light of all of the films, and then, if desired, the cardboard form, being of little value and having served the purpose, may be discarded.

In carrying out the idea of a cheap and simple camera for making pictures although not necessary as a part of the invention, I make use of the pinhole principle as a substitution for a lens in focusing the image to be photographed on the film.

It is a fact not generally known that good photographs can be made with a pinhole camera if there be allowed sufficient time for exposure. Accordingly, my invention contemplates, in addition, means for securing the camera in a fixed position and for holding it steadily in that position until an adequate exposure has been obtained. That it might be desirable to extend the use of this invention to the employment of photographic lenses and shutters too valuable to discard each time, as might be done with the pinhole form, I have devised an alteration in the sheet forms whereby a lens and shutter, combined in the form of a front board, may be attached in a position of focus, forward of the film, when setting up the camera. These lens and shutter outfits are to be retained each time a sheet form is discarded.

The gummed and foldable sheet forms contemplated by this invention may be cut in blanks adaptable to other kinds of light-protected film containers, such as spools, plate holders, and magazines.

Reference is made to the accompanying drawings forming a part of this specification and in which like characters indicate like parts through the several figures.

Figure 1 is a perspective view of one form of my improved camera showing it as mounted upon a support and ready for use;

Fig. 2 is a section on the line 2—2 of Fig. 1 looking in the direction of the arrows;

Fig. 3 is a section on the line 3—3 of Fig. 2 looking in the direction of the arrows;

Fig. 4 is a plan view of the blanks of sheet material of which the camera is constructed;

Fig. 5 is a plan view of the same blanks showing them changed in relative position, or, in other words, partially folded;

Fig. 6 is a view of the same blanks appearing in Figs. 4 and 5 and shows them as folded still further in order to adapt them to be carried in a small compass or placed within the operator's pocket;

Fig. 7 is a plan view of another cardboard form particularly suitable for use with a front board carrying a lens and shutter;

Fig. 8 is a view, partly in perspective and partly broken away, showing the cardboard form just mentioned, as used in connection with the front board and lens, and with a film.

The camera as a whole appears at 12 in this figure and is made from the parts shown in Fig. 4 in combination with the film-pack attached to form the base. A blank 13 is provided with an end portion 13ª and with a waist portion 13ᵇ, these parts being of the form shown in Fig. 4. This blank is further provided with a gummed flap edge 14 extending along its entire peripheral edge. Engaging the blank member 13 is another blank member 18, as shown more particularly in Fig. 4. This blank member 18 is provided with gummed flap edges 19. The blanks 13 and 18 are scored and bent so as to assume the form indicated in Figs. 2 and 3.

Extending through the adjacent portions of the blank members 13 and 18 is a guard ring 20 of the form shown more particularly in Fig. 2, and provided with flanges 21 and 23, and also with a reinforcing flange 22 secured firmly to the flange 23. The parts 20, 21, 22 and 23 may be made of metal and considered as a sort of eyelet. After the blank members are bent they are secured by means of the gummed flap edges 14 and 19, and a facing 24 of paper or cardboard is pasted upon the end of the boxlike member thus formed. This facing is provided with a pinhole 25. Disposed adjacent the pinhole is a slide-holder 26, which may be made of paper or cardboard. Mounted within this slide-holder is a slide 28. The slide-holder 26 is provided with an opening 27 used in connection with the exposure of the film. The slide 28 is provided with end portions 29 and 30 which are of the form adapted to be grasped by the operator's fingers in order to enable him to move the slide up and down.

Associated with the button disks 15 are cords 32 and a rubber band 33 to which these cords are secured. The operator by winding the cords 32 around the button disks 15 can secure them to the camera, and if this be done by the rubber band 33 under tension, the camera is very effectively and firmly held against the support 11, as may be understood from Fig. 1. A film-pack is shown at 34, and at 35 are the flaps forming a part of this film-pack and by the aid whereof the films are detached one at a time.

If desired, another form of film-pack may be substituted for the one here shown, or even a single film may be employed.

The operation of the device shown in Figs. 1 to 4 is very simple. The film-pack is actuated after the manner that a film-pack is used in practice in any other camera. The slide 30 is pushed up or down by hand so as to expose the pinhole 25 through the openings 27 and 31 or to prevent the light from reaching the pinhole 25 according to the position of the slide 28.

The camera being focused upon the scene or object to be photographed, the film-pack and the slide are actuated in the conventional manner to make the exposure. The subsequent removal and development of the film are performed in the usual or any desired manner.

For the purpose of portability, the free members shown in Fig. 4 may be turned relative to each other, as shown in Fig. 5, and thus brought into a comparatively small compass. If desired, they may be folded still further, as shown in Fig. 6, thus reducing them into a still smaller compass.

In some instances I employ the construction shown in Figs. 7 and 8. A cardboard blank 50 is provided with score lines 51, 52 and 53 and is thus adapted to be bent into the proximate form of a camera. The blank is provided with gummed edges 54, 55, and 56 and when the blank is bent as indicated in Fig. 8 and the gummed edges are secured firmly in position as shown in this figure the camera is complete. A lens 57 and shutter 58 are mounted permanently upon a front board 59 and this board forms a part of the camera. A film-pack 60 having the usual border member 61 for actuating the pack is provided and is secured to the blank thus forming practically a part of the camera.

The cardboard blank is so proportioned that when the parts are in position as indicated in Fig. 8 the film is in focus. In other words, the lens and shutter carried by the front board 59 are automatically placed in position proper for the focus, and forward of the film when the camera is set up. If desired, instead of the film-pack 60 a single film may be employed. With this form of my camera, the lens and shutter, and preferably the front board 59 are retained each time the cardboard camera is discarded.

Except as otherwise noted the action of the camera shown in Fig. 8 is the same as that above described with reference to other figures.

I do not limit myself to the particular constructions here shown, as variations may be made therefrom without departing from the spirit of my invention. Neither do I limit myself to any particular use to be made of the camera or to any special materials to be employed in its constuction. While preferably the principal blank members may be made of paper or cardboard, there is nothing to prevent them from being made of leather or other more durable material if occasion should require.

Having thus described my invention, what I claim and desire to secure by Letters Patent is as follows:

1. As an article of manufacture, a camera comprising a film-pack, a cardboard form to be connected therewith, said cardboard form being provided with gummed edges whereby it may be formed into a camera box, and a front board carrying a lens and shutter and adapted to be connected to said cardboard form so as to be fixed relatively to said film pack.

2. The combination of a film-pack serving as a base, a cardboard form provided with gummed edges to be secured to said film-pack and connected by said gummed edges to serve as a camera box, and a front board provided with image forming means, and further provided with a shutter for controlling the admission of light through said image forming means.

3. As an article of manufacture a front board provided with a lens and a shutter in combination with a card board form provided with a pair of oppositely disposed gummed edges and with score lines so positioned as to facilitate bending said card board form in order to cause said oppositely disposed edges to meet together, said card board form being further provided with gummed edges for securing it to said front board in order to form therewith a camera.

NAT ELMER BROWN.